United States Patent

Kayumi et al.

[11] Patent Number: 5,971,467
[45] Date of Patent: Oct. 26, 1999

[54] TILTING STRUCTURE FOR MOTOR VEHICLE SEAT

[75] Inventors: Tetsuya Kayumi; Hidetsugu Okazaki, both of Wako, Japan

[73] Assignee: Honda Giken Kogyo Kabushiki Kaisha, Tokyo, Japan

[21] Appl. No.: 08/719,837

[22] Filed: Sep. 30, 1996

[30] Foreign Application Priority Data

Oct. 6, 1995 [JP] Japan ..................... 7-260523
Oct. 6, 1995 [JP] Japan ..................... 7-286572

[51] Int. Cl.⁶ ..................... B60N 1/02
[52] U.S. Cl. ............. 296/66; 296/65.05; 296/198
[58] Field of Search .............. 296/66, 65.05, 296/65.08, 65.09, 65.16, 65.17, 198; 280/848, 849, 851; 297/378.1, 331, 335

[56] References Cited

U.S. PATENT DOCUMENTS

| 4,354,708 | 10/1982 | Koto ..................... 296/198 X |
| 4,627,656 | 12/1986 | Gokimoto et al. ........... 296/65.05 |
| 4,919,474 | 4/1990 | Adachi et al. ............. 296/198 X |
| 5,133,589 | 7/1992 | Kimura ................... 296/65.09 |
| 5,558,386 | 9/1996 | Tilly et al. .............. 296/65.09 |
| 5,658,046 | 8/1997 | Rus ...................... 296/66 |

FOREIGN PATENT DOCUMENTS

| 56-89733 | 12/1954 | Japan . |
| 59-101837 | of 1984 | Japan . |
| 58-3330 | of 1985 | Japan . |
| 60-122232 | of 1985 | Japan . |
| 60-64141 | of 1985 | Japan . |
| 61-135741 | of 1986 | Japan . |
| 61-983638 | of 1986 | Japan . |
| 62-148446 | of 1987 | Japan . |
| 63-34253 | of 1988 | Japan . |
| 646346 | 2/1989 | Japan . |
| 2-147329 | of 1990 | Japan . |
| 2-17433 | of 1990 | Japan . |
| 2-76533 | of 1990 | Japan . |
| 4-31027 | of 1992 | Japan . |
| 4-43528 | of 1992 | Japan . |
| 55-37796 | of 1992 | Japan . |
| 7-13564 | of 1995 | Japan . |

OTHER PUBLICATIONS

Pertinent Portions of JP 64–6346 in English.
Office Action in JP 7j–286572 and English translation.
Office Action in JP 7–260523 and English translation.

Primary Examiner—Joseph D. Pape
Attorney, Agent, or Firm—Lyon & Lyon LLP

[57] ABSTRACT

A tilting structure for tilting a motor vehicle seat has a seat having a seat cushion, a tilting mechanism disposed underneath the seat cushion for tilting the seat cushion upwardly about a front end thereof to hold the seat cushion and a backrest aligned with each other in a fully flat configuration when the backrest is tilted down rearward, a joint device separably connecting a rear end of the seat cushion to the tilting mechanism, and a cover disposed between the seat cushion and the tilting mechanism and covering the tilting mechanism. The tilting structure can maintain the seat cushion and the backrest fully flat in alignment with each other, and also can tilt the seat cushion up forward.

34 Claims, 20 Drawing Sheets

TILTING STRUCTURE FOR MOTOR VEHICLE SEAT

BACKGROUND OF THE INVENTION

1. Field of the Invention

The present invention relates to a tilting structure for tilting a backrest of a seat backward until the backrest and a seat cushion of the seat are substantially aligned with each other.

2. Description of the Related Art

Recreational vehicles (RVs) dedicated for enjoying leisure activities are finding widespread use among people whose life-styles are changing in recent years. It is known that when the backrest of a seat in such recreational vehicles is tilted backward and the rear end of the seat cushion is tilted upward, the backrest and the seat cushion are substantially aligned with each other.

Japanese utility model publication No. 64-6346 discloses a lifter device comprising a first rod angularly movably mounted on a side plate of a cushion frame of a seat cushion, and a second rod angularly movably mounted on a base and angularly movably coupled to the first rod. When a back frame of a backrest is tilted backward, the first and second rods are angularly moved through a moving mechanism, causing the rear end of the seat cushion to be lifted until the seat cushion and the backrest are substantially aligned with each other.

The lifter device is directly mounted on the cushion frame of the seat cushion. Therefore, the lifter device cannot be used in combination with a seat structure which allows the rear surface of a backrest to be used as a cargo base when a seat cushion is lifted forward and the backrest is lowered or tilted down forward toward the seat cushion. Consequently, the lifter device is not versatile in applications, and may not be used with seats in recreational vehicles, for example.

FIG. 20 of the accompanying drawings shows known rear seats 2a, 2b in a recreational vehicle, each having a backrest that can be tilted a large angle rearward. The rear seats 2a, 2b have respective seat cushions 3a, 3b and respective backrests 4a, 4b. When the backrests 4a, 4b are tilted rearward, the rear seats 2a, 2b are made substantially flat.

The recreational vehicle has wheel houses 5a, 5b which accommodate rear wheels and rear suspension damper bases. Since the wheel houses 5a, 5b are positioned behind the rear seats 2a, 2b, respectively, they prevent the backrests 4a, 4b from being tilted rearward in their entirety. Usually, when the backrests 4a, 4b are tilted rearward, side portions 6a, 6b of the respective backrests 4a, 4b remain untilted due to physical interference with the wheel houses 5a, 5b. AS a result, the width H, i.e., the dimension in the transverse direction of the motor vehicle, of those portions of the backrests 4a, 4b which can be tilted rearward is considerably small.

SUMMARY OF THE INVENTION

It is a general object of the present invention to provide a tilting structure for a motor vehicle seat, which allows the seat to be kept substantially flat from a seat cushion to a backrest thereof when the backrest is tilted rearward, and also permits the seat cushion to be lifted forward, so that the seat can be used in various applications and hence is versatile in applications.

A principal object of the present invention is to provide a tilting structure for a motor vehicle seat, which is of a relatively simple structure for tilting a backrest of the seat rearward in its entirety thereby to provide an effective space in the transverse direction of the motor vehicle.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
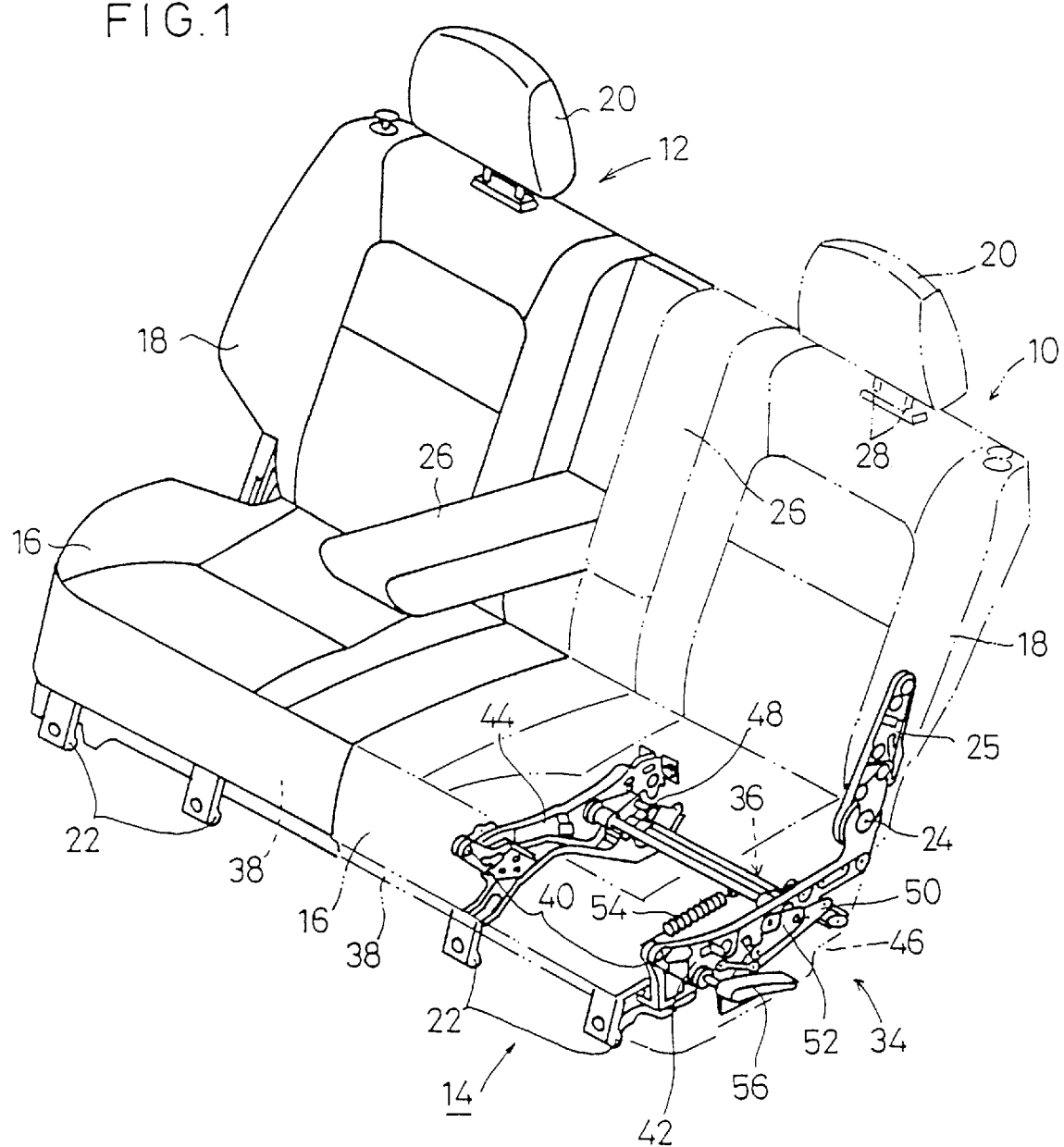
FIG. 1 is a perspective view of rear seats each incorporating a tilting structure according to a first embodiment of the present invention.

FIG. 1 shows in perspective a pair of rear seats 10, 12 for use in a motor vehicle, typically a recreational vehicle, and a tilting structure 14 which is incorporated in each of the rear seats 10, 12. Since the rear seats 10, 12 are identical in structure to each other, only the rear seat 10 will be described below, and those parts of the rear seat 12 which are identical to those of the rear seat 10 are denoted by identical reference numerals and will not be described in detail below.

As shown FIGS. 1 through 4, the rear seat 10 comprises a seat cushion 16, a backrest 18, and a headrest 20 detachably mounted on an upper edge of the backrest 18. The seat cushion 16 can be lifted or tilted up forward about a first pivot 22 disposed in a front position. The backrest 18 can be lowered or tilted down forward toward the seat cushion 16 and tilted rearward about a shaft 24 by a reclining mechanism 25. An armrest 26 is liftably mounted on one side of the backrest 18. The headrest 20 has a pair of stays 28 extending substantially downwardly for insertion into an upper edge of the backrest 18 for securely fixing the headrest 20 to the upper edge of the backrest 18.

Figure 2:
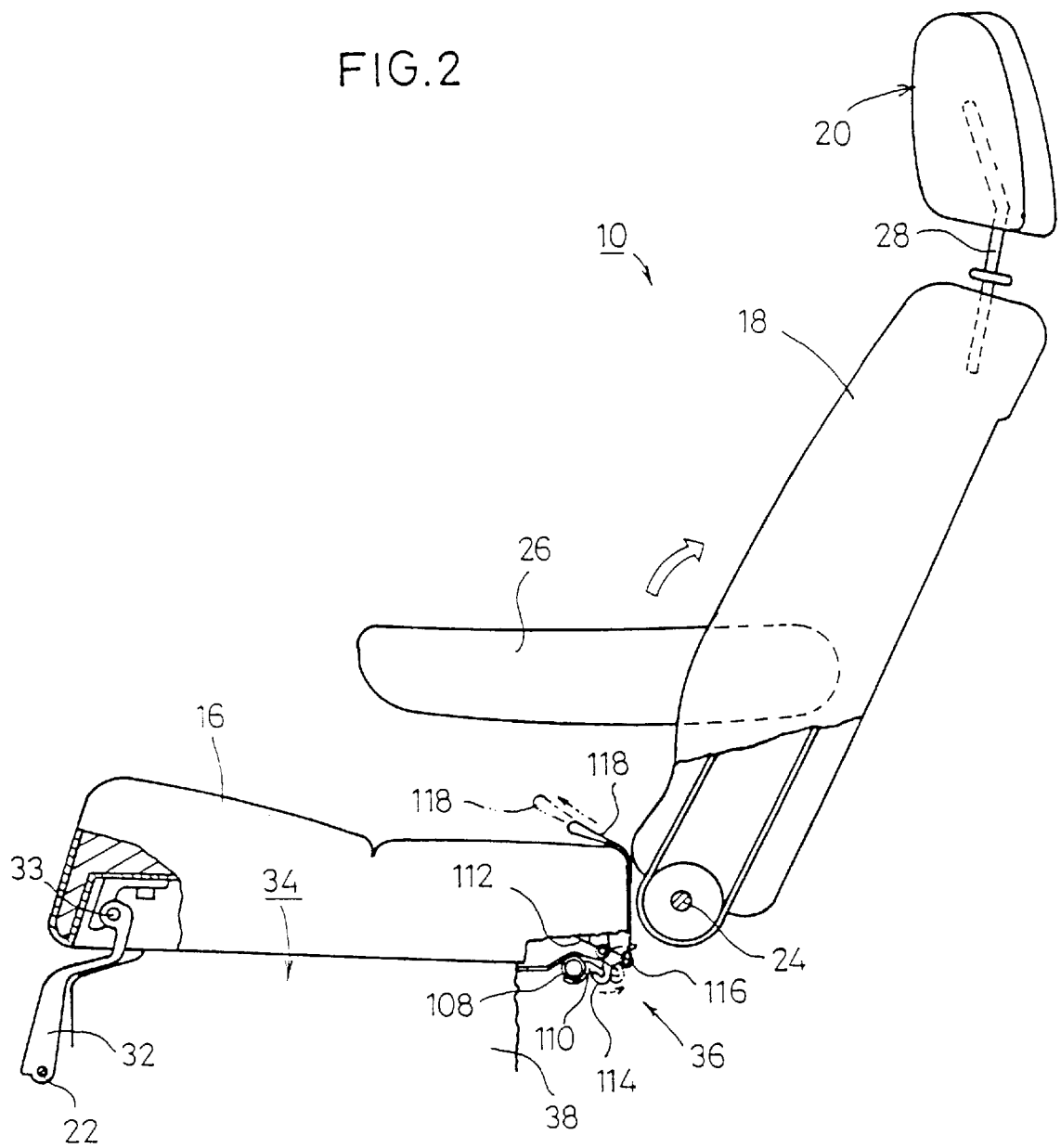
FIG. 2 is a side elevational view, partly cut away, of one of the rear seats.
Figure 4:
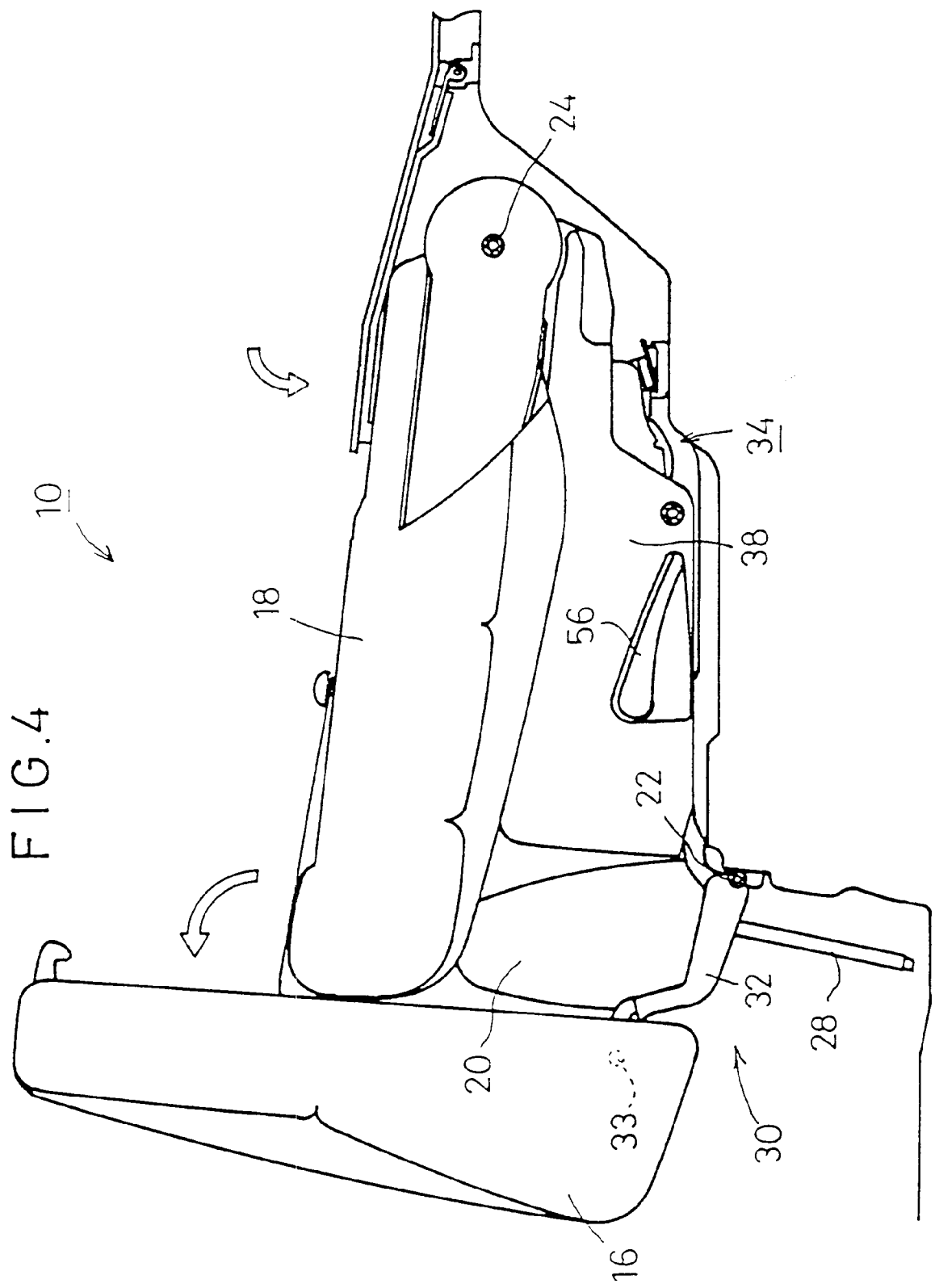
FIG. 4 is a is a side elevational view of the rear seat which is adjusted to use a rear surface of a backrest thereof as a cargo base.

As shown in FIG. 4, a headrest storage mechanism 30 is disposed between the seat cushion 16 as it is lifted or tilted up forward and the backrest 18 as it is lowered or tilted down forward. The headrest storage mechanism 30 comprises a pair of arms 32 interconnecting the first pivot 22 and the seat cushion 16. The arms 32 can support thereon the headrest 20 which is removed from the backrest 18 when the seat cushion 16 is lifted or tilted up forward. As shown in FIG. 2, the first pivot 22 is disposed on one end of the arms 32, which have a second pivot 33 on their other end. The second pivot 33 serves as a tilt pivot for the seat cushion 16.

Figure 5:
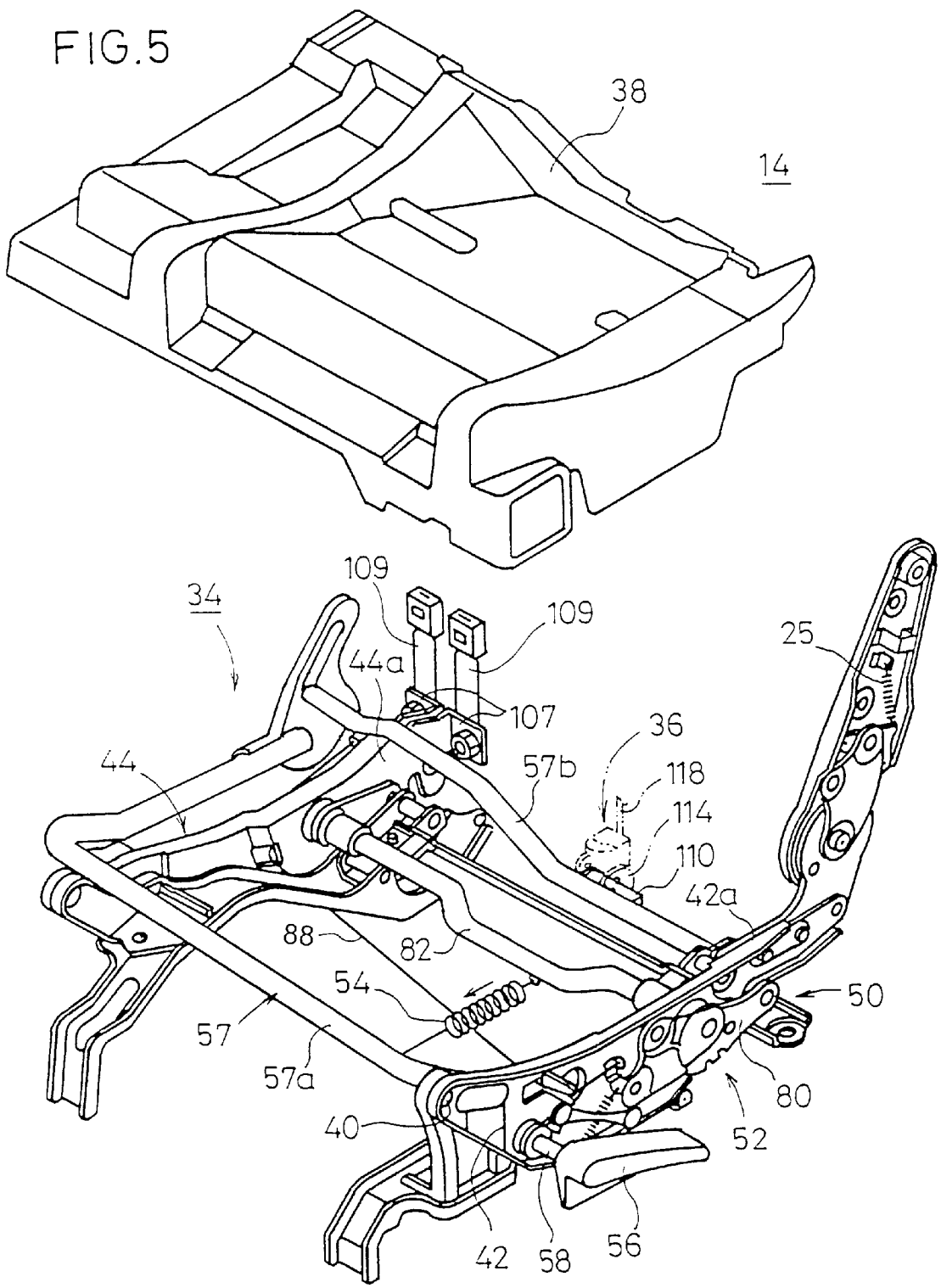
FIG. 5 is a fragmentary perspective view of the tilting structure.

As shown in FIGS. 1 and 5, the tilting structure 14 is disposed below the seat cushion 16. The tilting structure 14 comprises a tilting mechanism 34 for tilting the seat cushion 16 upwardly about the second pivot 33 until the seat cushion 16 and the backrest 18 are substantially aligned with each other when the backrest 18 is lowered rearward, a joint device 36 by which a rear portion of the seat cushion 16 is detachably connected to the tilting mechanism 34, and a cover 38 which is positioned above and covers the tilting mechanism 34.

The tilting mechanism 34 comprises first and second tiltable plates (tilting members) 42, 44 tiltable about a tilt pivot 40 aligned with the second pivot 33, a lock device 48 for locking a rear end 44a of the second tiltable plate 44 on a floor 46, a openable and closable link device 50 having an end connected to the floor 46 and an opposite end connected to the first and second tiltable plates 42, 44, a retainer device 52 for retaining the openable and closable link device 50 selectively in an open attitude and a closed attitude, and a helical spring (biasing means) 54 for biasing the openable and closable link device 50 to turn the seat cushion 16 upwardly about the second pivot 33 when the openable and closable link device 50 is released from the retainer device 52. A single knob (control member) 56 is connected to the lock device 48 and the retainer device 52. The first and second tiltable plates 42, 44 are fixed to a frame 57.

Figure 6:
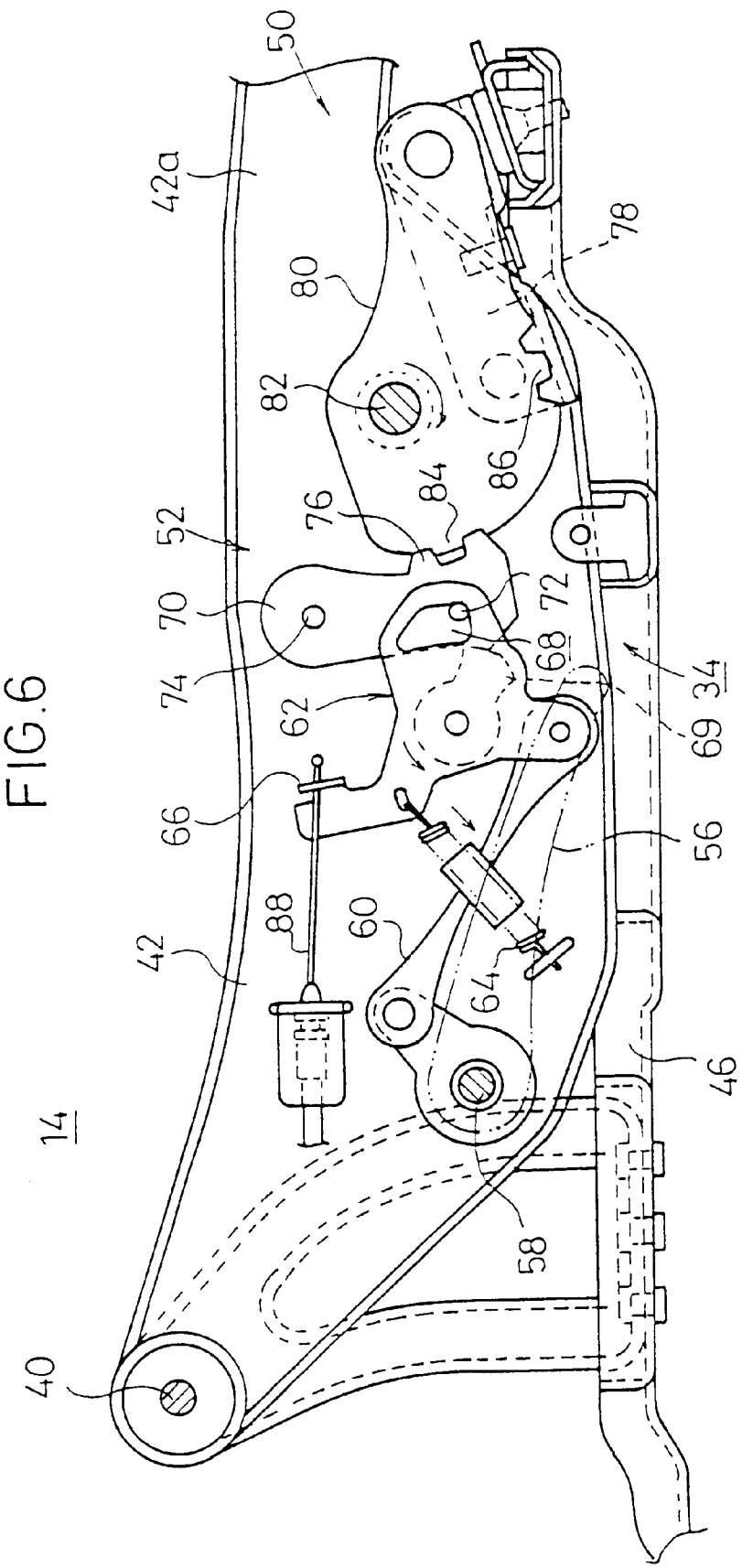
FIG. 6 is a fragmentary side elevational view of a tilting mechanism of the tilting structure.
Figure 7:
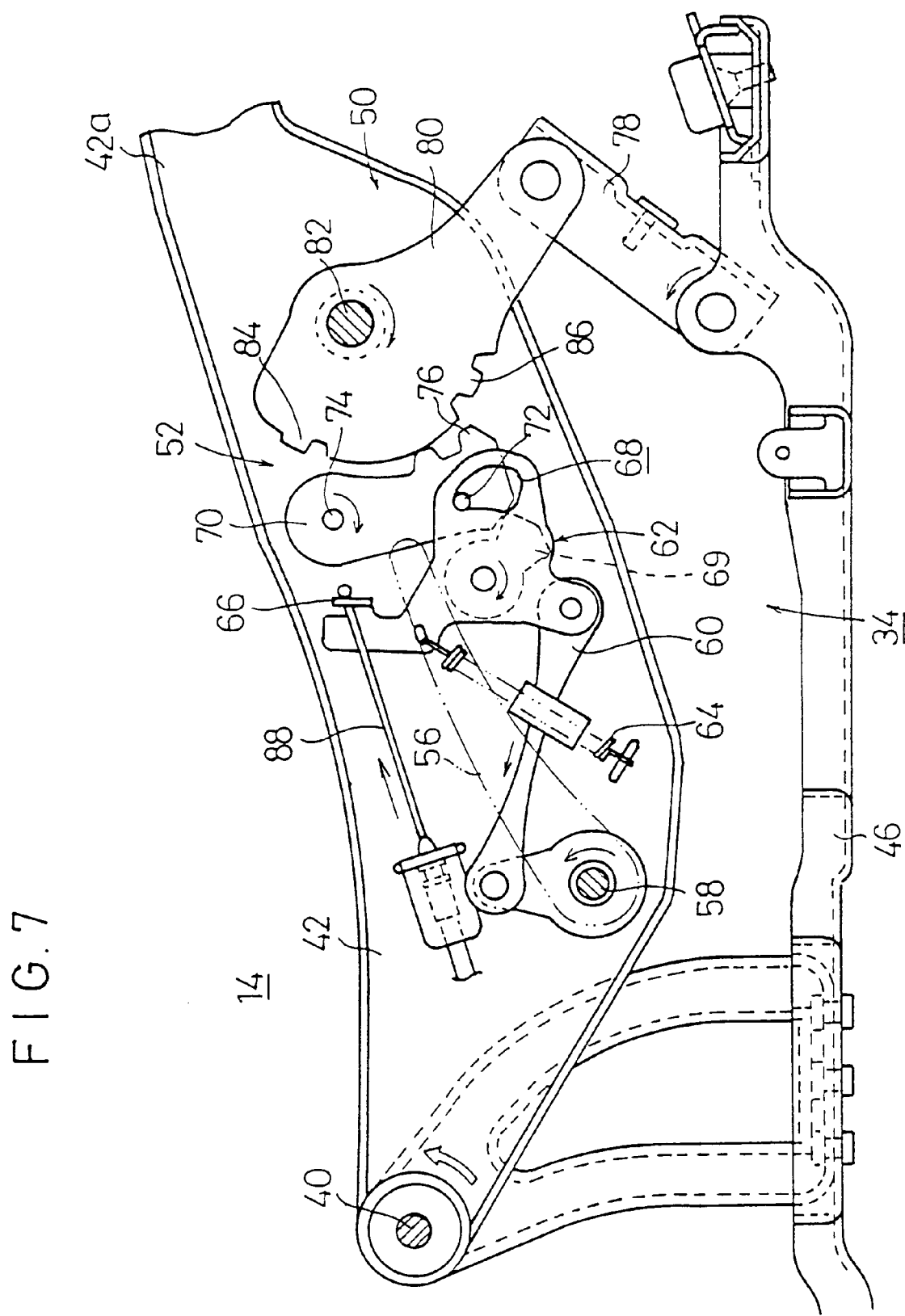
FIG. 7 is a fragmentary side elevational view of the tilting mechanism as it operates.
Figure 8:
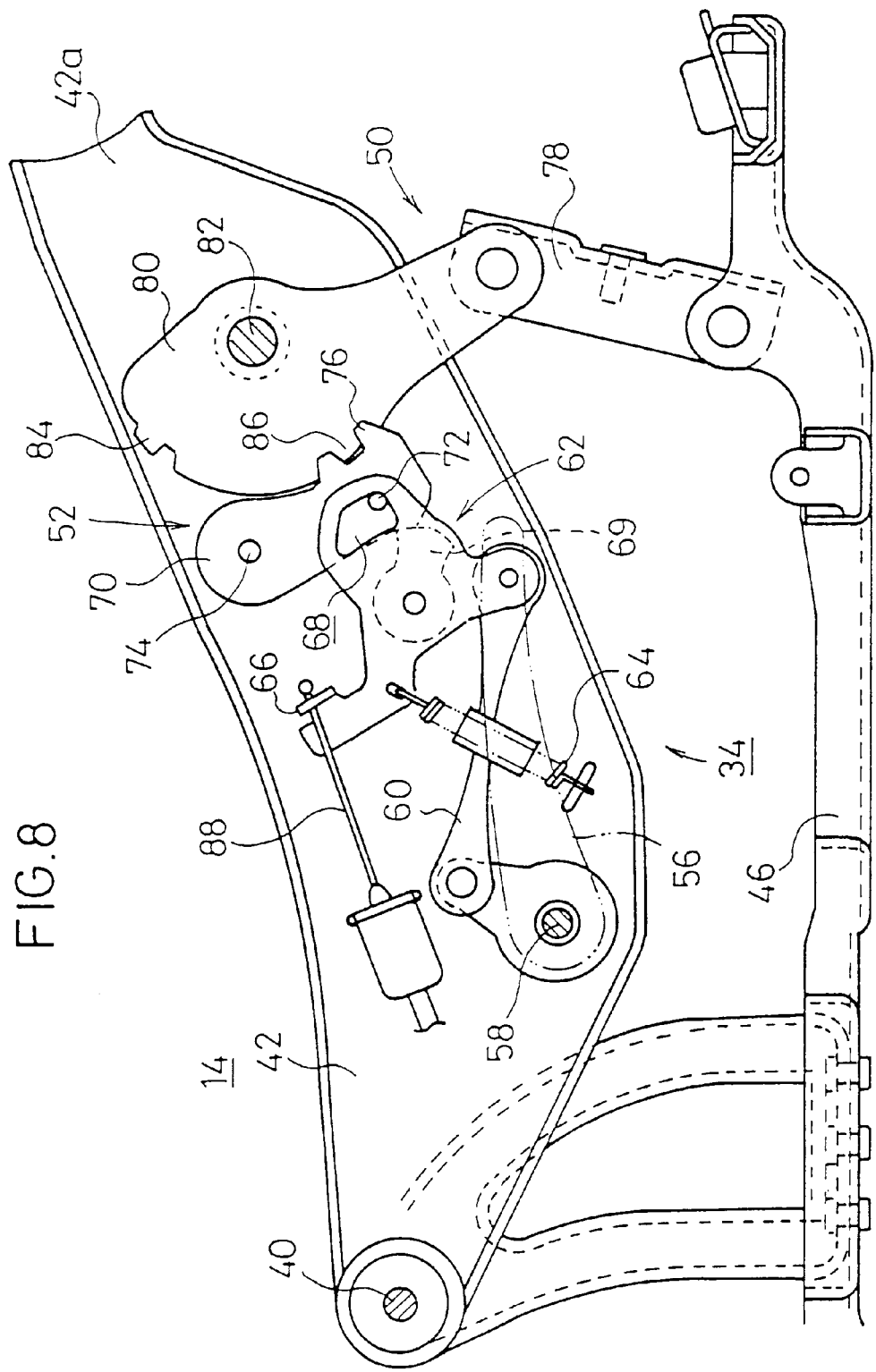
FIG. 8 is a fragmentary side elevational view of the tilting mechanism which is lifted to an upper limit position.

As shown in FIGS. 6 through 8, a shaft 58 connected to the knob 56 is rotatably supported by the first tiltable plate 42, and a connecting rod 60 has an end operatively connected to the shaft 58. The other end of the connecting rod 60 is operatively connected to an angularly movable operating member 62 which is normally biased by a tension spring 64 to turn counterclockwise in the direction indicated by the arrow in FIG. 6.

The operating member 62 has an engaging arm 66, a guide opening 68, and a cam plate 69. The guide opening 68 receives therein a guide pin 72 mounted on a stopper 70 of the retainer device 52. The stopper 70 is swingably supported on the first tiltable plate 42 by a pivot 74, and pressed toward the openable and closable link device 50 by the cam plate 69. The stopper 70 has teeth 76 on a side thereof which faces the openable and closable link device 50.

The openable and closable link device 50 has a link 78 having an end operatively coupled to the floor 46 and a link arm 80 operatively coupled to the other end of the link 78. The link arm 80 is fixed to an end of a rotatable shaft 82, and another link arm (not shown) is fixed to the other end of the rotatable shaft 82. As shown in FIG. 5, the helical spring 54 is connected to and extends between the rotatable shaft 82 and a front end portion 57a of the frame 57 for normally biasing the rotatable shaft 82 to turn in the direction indicated by the arrow in FIG. 6.

As shown in FIGS. 6 through 8, the link arm 80 has, on a side thereof, a first tooth 84 for meshing with the teeth 76 of the stopper 70 when the seat cushion 16 is placed in a seated attitude, i.e., when the openable and closable link device 50 is in a closed attitude, and a second tooth 86 for meshing with the teeth 76 when the seat cushion 16 is placed in an upwardly tilted attitude, i.e., when the openable and closable link device 50 is in an open attitude.

A drive wire 88 has an end positioned for engagement with the engaging arm 66 of the operating member 62. As shown in FIG. 5, the drive wire 88 extends through the first tiltable plate 42 toward the second tiltable plate 44, and has an end engaging an end of a lever 90 (see FIG. 9) at the rear end 44a of the second tiltable plate 44.

Figure 9:
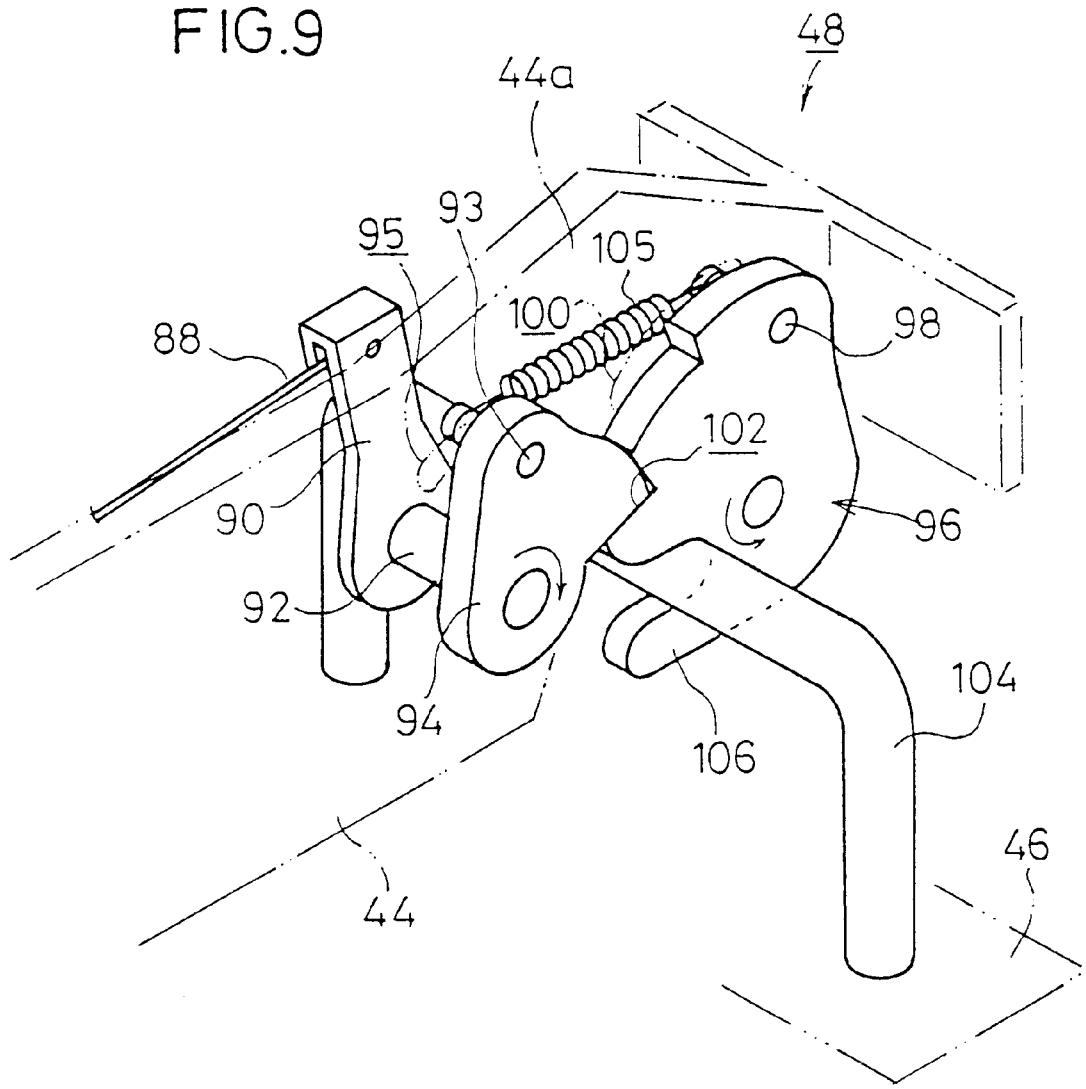
FIG. 9 is a perspective view of a lock device of the tilting structure.
Figure 10:
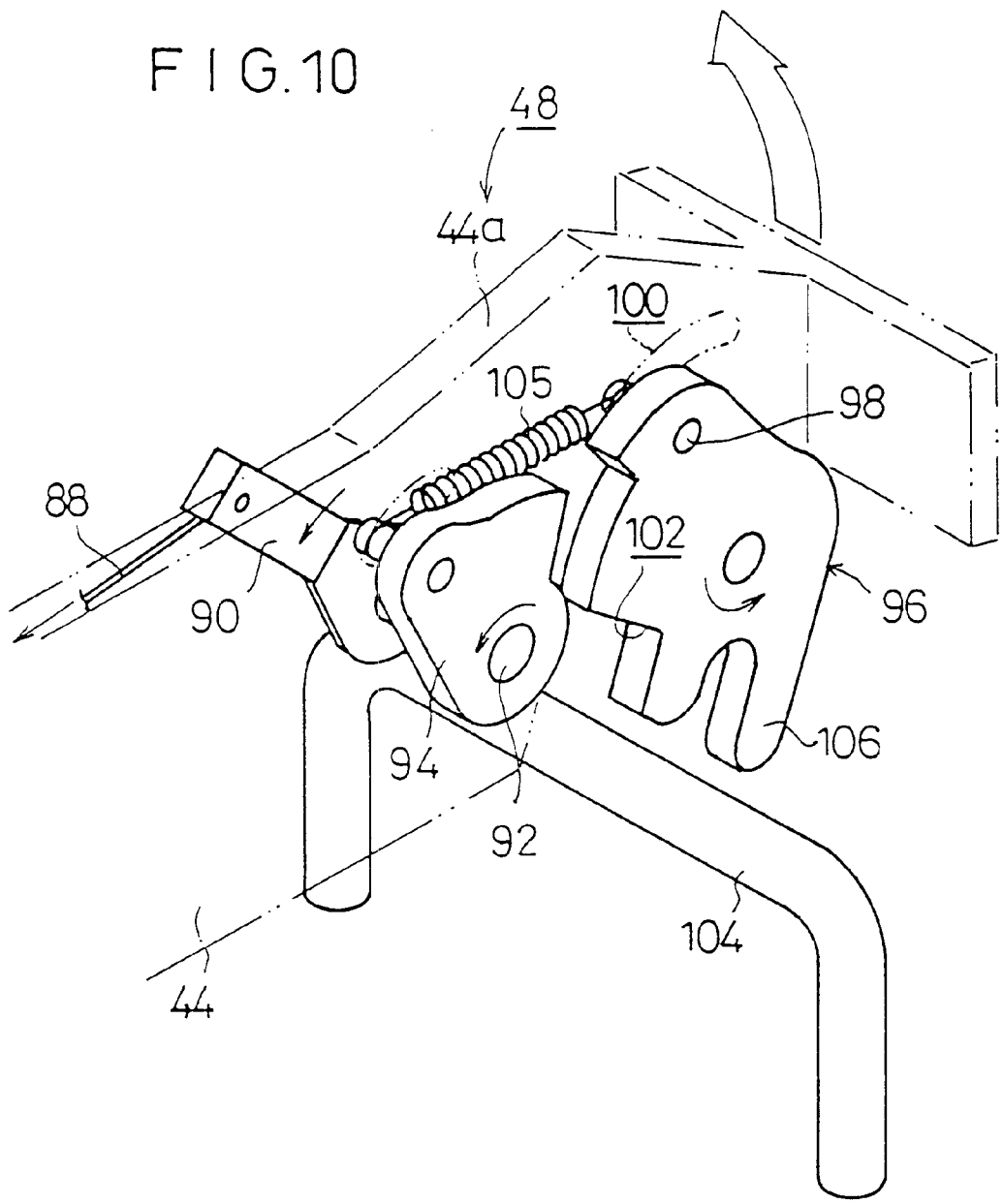
FIG. 10 is a perspective view showing the lock device in an unlocked state.

As shown in FIGS. 9 and 10, the lever 90 is fixed to an end of an angularly movable shaft 92 whose other end is connected to a cam 94 that is axially spaced from the lever 90 in parallel relation thereto. The cam 94 is angularly movable in a certain angular range which is defined jointly by a guide pin 93 mounted thereon and a guide groove 95 defined in the rear end 44a and receiving the guide pin 93.

A latch 96 is angularly movably supported on the rear end 44a of the second tiltable plate 44. The latch 96 supports a guide pin 98 movably received in a guide groove 100 defined in the rear end 44a for limiting angular movement of the latch 96 to a certain angular range. The latch 96 has a recess 102 defined in its peripheral edge for receiving the cam 94 and an arm 106 projecting from its peripheral edge for engaging a striker 104 mounted on the floor 46 when the cam 94 engages in the recess 102. The cam 94 and the latch 96 are normally biased to turn in the directions indicated by the respective arrows in FIG. 9 by a helical spring 105 connected to and extending between the guide pins 93, 98.

As shown in FIG. 5, seat belts 109 have ends fixed to the rear end 44a by fasteners 107 comprising bolts and nuts.

As shown in FIGS. 2 and 5, the joint device 36 comprises a lock member 110 fixed to a rear end portion 57b of the frame 57 positioned at the rear ends 42a, 44a of the first and second tiltable plates 42, 44, a hook member 114 mounted on the seat cushion 16 and normally biased into engagement with the lock member 110 by a spring 112 on the seat cushion 16, and a tension string 118 wound on a projection 116 on the hook member 114 for being manually pulled upwardly to a position above the seat cushion 16.

Operation of the tilting structure 14 will be described below.

The backrest 18 is lowered rearward by the reclining mechanism 25, and the knob 56 is turned upwardly by the user. As shown in FIG. 7, the shaft 58 is rotated in unison with the knob 56, pulling the connecting rod 60 in the direction indicated by the arrow. The operating member 62 connected to the connecting rod 60 is now turned clockwise in the direction indicated by the arrow against the bias of the tension spring 64. Since the guide pin 72 is positioned in the guide opening 68 of the operating member 62, the clockwise rotation of the operating member 62 causes the stopper 70 to move away from the link arm 80.

Therefore, the teeth 76 of the stopper 70 are displaced out of mesh with the first tooth 84 of the link arm 80, which is then turned in the direction indicated by the arrow under the bias of the helical spring 54 connected to the rotatable shaft 82. The link arm 80 and the link 78 are biased into an opening direction. Assisted by lifting movement imparted by the user, the rear ends 42a, 44a of the first and second tiltable plates 42, 44 are tilted upwardly about the tilt pivot 40, tilting the seat cushion 16 upwardly about the second pivot 33.

As shown in FIG. 7, when the operating member 62 is turned by upward movement of the knob 56, the drive wire 88 is pulled by the engaging arm 66. Therefore, as shown in FIG. 10, the drive wire 88 pulls the lever 90 counterclockwise in the direction indicated by the arrow, causing the angularly movable shaft 92 to turn the cam 94 in the direction indicated by the arrow. The cam 94 is moved out of the recess 102 of the latch 96, which is now free to turn. Upon the upward movement of the rear ends 42a, 44a of the first and second tiltable plates 42, 44, the latch 96 is turned under the tension of the helical spring 105 while being guided by the guide pin 98 and the guide groove 100, with the arm 106 engaging the striker 104. Thereafter, the arm 106 disengages from the striker 104 whereupon the lock device 48 releases the rear ends 42a, 44a of the first and second tiltable plates 42, 44 from the floor 46.

Figure 3:
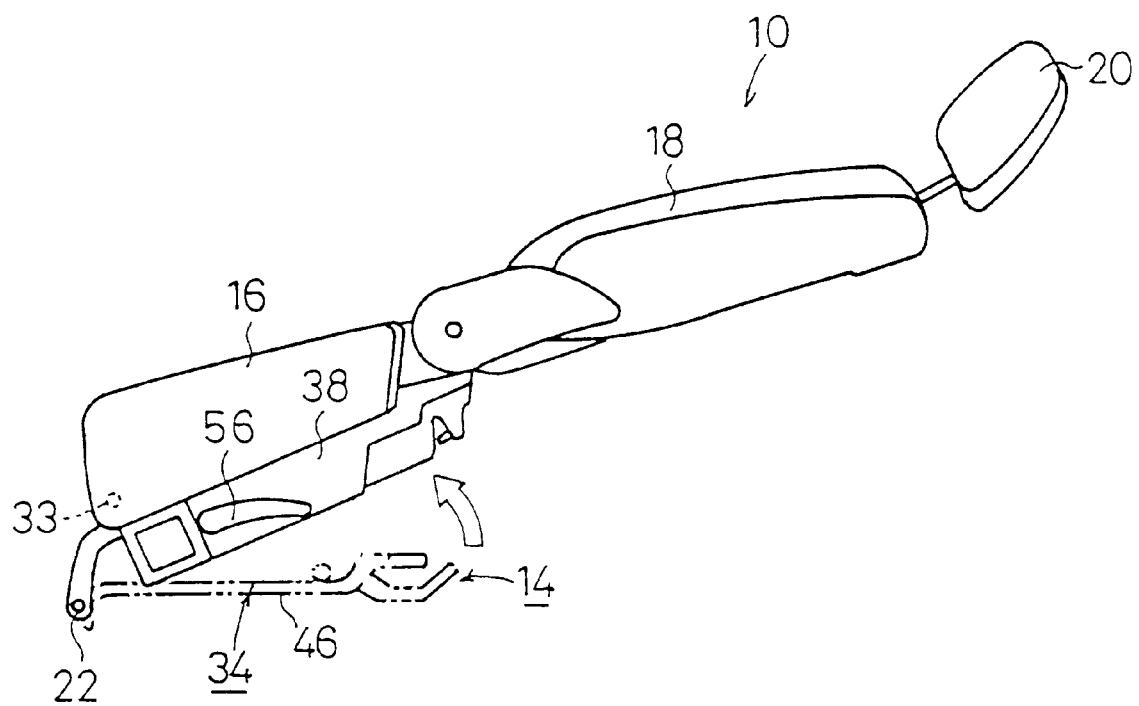
FIG. 3 is a side elevational view of the rear seat shown in FIG. 2, which is adjusted to a substantially flat configuration.

In this manner, the user lifts the knob 56 to release the openable and closable link device 50 from the retainer device 52, unlocks the lock device 48 to release the tilting mechanism 34, i.e., the second tiltable plate 44, from the floor 46, and pushes the rear portion of the seat cushion 16 upwardly under the bias of the helical spring 54. When the seat cushion 16 is lifted to a certain tilted attitude, as shown in FIG. 8, the teeth 76 of the stopper 70 are brought into mesh with the second tooth 86 of the link arm 80. Therefore, the openable and closable link device 50 is retained in its open attitude by the retainer device 52, holding the seat cushion 16 and the backrest 18 substantially aligned with each other, as shown in FIG. 3.

According to the first embodiment described above, the openable and closable link device 50 can be released from the retainer device 52 and the first and second tiltable plates 42, 44 are unlocked from the floor 46 by the lock device 48 when the user operates the single knob 56. Therefore, the tilting structure 14 can be operated by the user with utmost ease.

The helical spring 54 is operatively connected through the rotatable shaft 82 to the link arm 80 of the openable and closable link device 50, which is thus normally urged to turn under the tension of the helical spring 54. Consequently, the user can tilt the seat cushion 16 upwardly with relatively small forces, and hence can operate the tilting structure 14 easily.

The link arm 80 has the first and second teeth 84, 86 for meshing engagement with the teeth 76 of the stopper 70 when the link arm 80 is in the closed and open attitudes. Therefore, when the seat cushion 16 is tilted upward, the seat cushion 16 is firmly held in the upwardly tilted position by the meshing engagement of the second tooth 86 and the teeth 76.

Furthermore, the ends of the seat belts 109 are fixed to the rear end 44a of the second tiltable plate 44 by the fasteners 107. When the seat cushion 16 is tilted upwardly, the seat belts 109 are lifted in unison with the rear end 44a of the second tiltable plate 44. Consequently, when the seat cushion 16 is tilted upwardly, the seat belts 109 are also lifted in unison with the seat cushion 16 without dropping through the gap between the seat cushion 16 and the backrest 18.

A process of lifting the seat cushion 16 forward and lowering the backrest 18 forward toward the seat cushion 16 for using the rear surface of the backrest 18 as a cargo base will be described below.

When the string 118 is pulled upwardly in the direction indicated by the arrow in FIG. 2, the projection 116 engaging the string 118 causes the hook member 114 to swing in the direction indicated by the arrow against the bias of the spring 112. Therefore, the hook member 114 is disengaged from the lock member 110. The seat cushion 16 is now released from the tilting mechanism 34.

Figure 11:
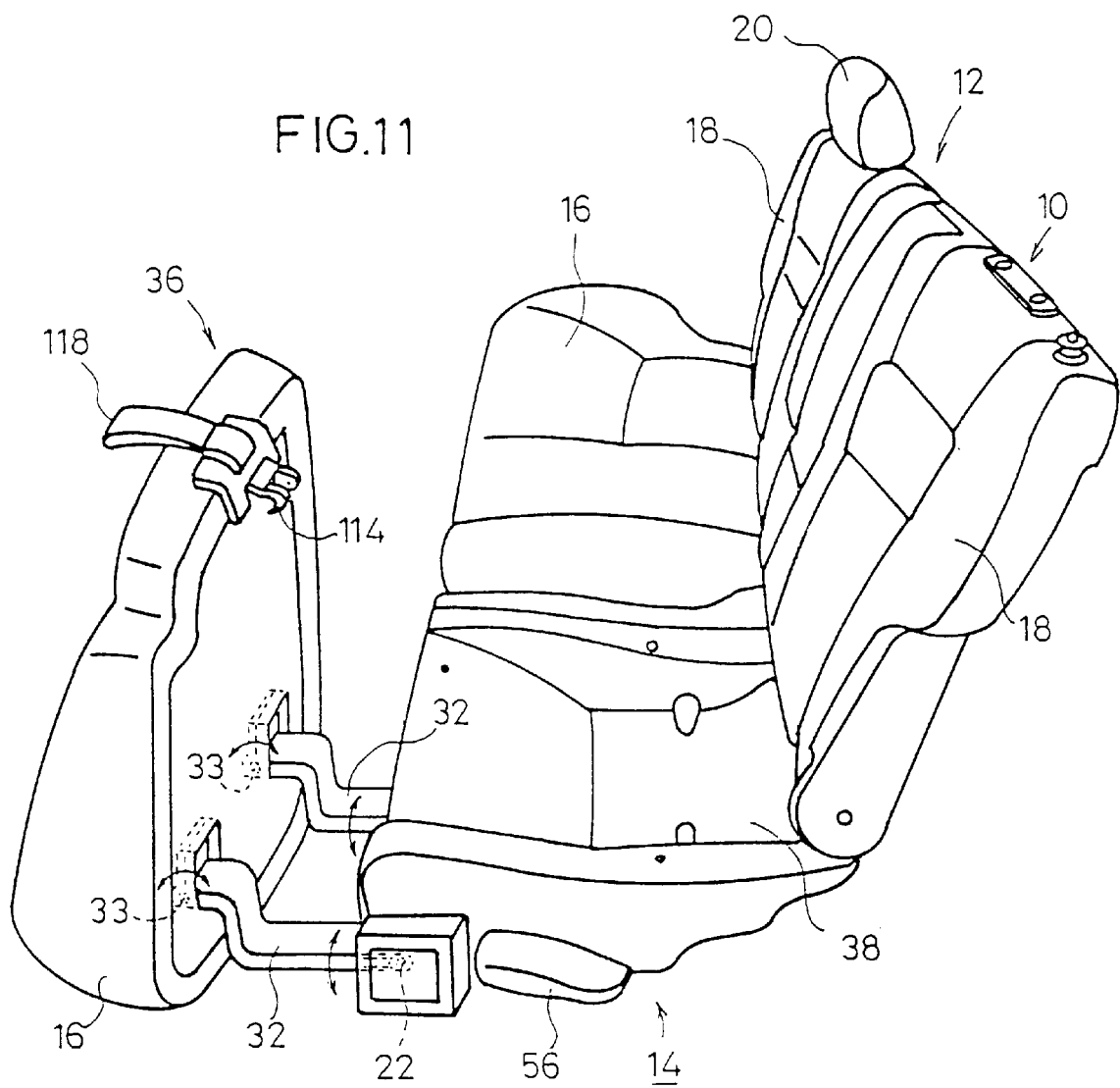
FIG. 11 is a perspective view of the rear seats, with a seat cushion of one of the rear seats being lifted forward.

After the seat cushion 16 is lifted upwardly about the first pivot 22 (see FIG. 11), the headrest 20 is detached from the backrest 18, and placed on the arms 32 and supported thereby. The backrest 18 is lowered forward toward the seat cushion 16, with the rear surface of the backrest 18 being usable as a cargo base (see FIG. 4).

According to the first embodiment, as described above, the seat cushion 16 is swingable about the second pivot 33, and can be tilted upwardly about the second pivot 33 in response to upwardly tilted movement of the first and second tiltable plates 42, 44 about the tilt pivot 40. Furthermore, when the seat cushion 16 is lifted forward about the first pivot 22 and the backrest 18 is lowered forward toward the seat cushion 16, the rear surface of the backrest 18 can be used as a cargo base. Therefore, the rear seats 10, 12 can be used in various applications and hence are versatile in applications.

When the seat cushion 16 is lifted forward after is separated from the tilting mechanism 34 by the joint device 36, the cover 38 which covers the tilting mechanism 34 is exposed. When the backrest 18 is then lowered forward, it is positioned over the cover 38 and does not directly contact the tilting mechanism 34. The backrest 18 is also protected from damage and smear which would otherwise be caused by direct contact with the tilting mechanism 34.

While the tilting mechanism 34 is shown as being directly fixed to the floor 46 in the first embodiment, the tilting mechanism 34 may be movably mounted on the floor 46 by a slide mechanism (not shown).

FIGS. 12 through 19 show a tilting structure 120 according to a second embodiment of the present invention. The tilting structure 120 includes the tilting structure 14 according to the first embodiment, which is incorporated in each of the rear seats 10, 12. Those parts of the tilting structure 120 which are identical to those of the tilting structure 14 are denoted by identical reference numerals, and will not be described in detail below.

As shown in FIGS. 12 through 15, the tilting structure 120 comprises the rear seats 10, 12 each incorporating the tilting structure 14, and side housing assemblies 124 disposed in a rear portion 13 of a motor vehicle, typically a recreational vehicle, and housing respective rear wheels 122.

Figure 14:
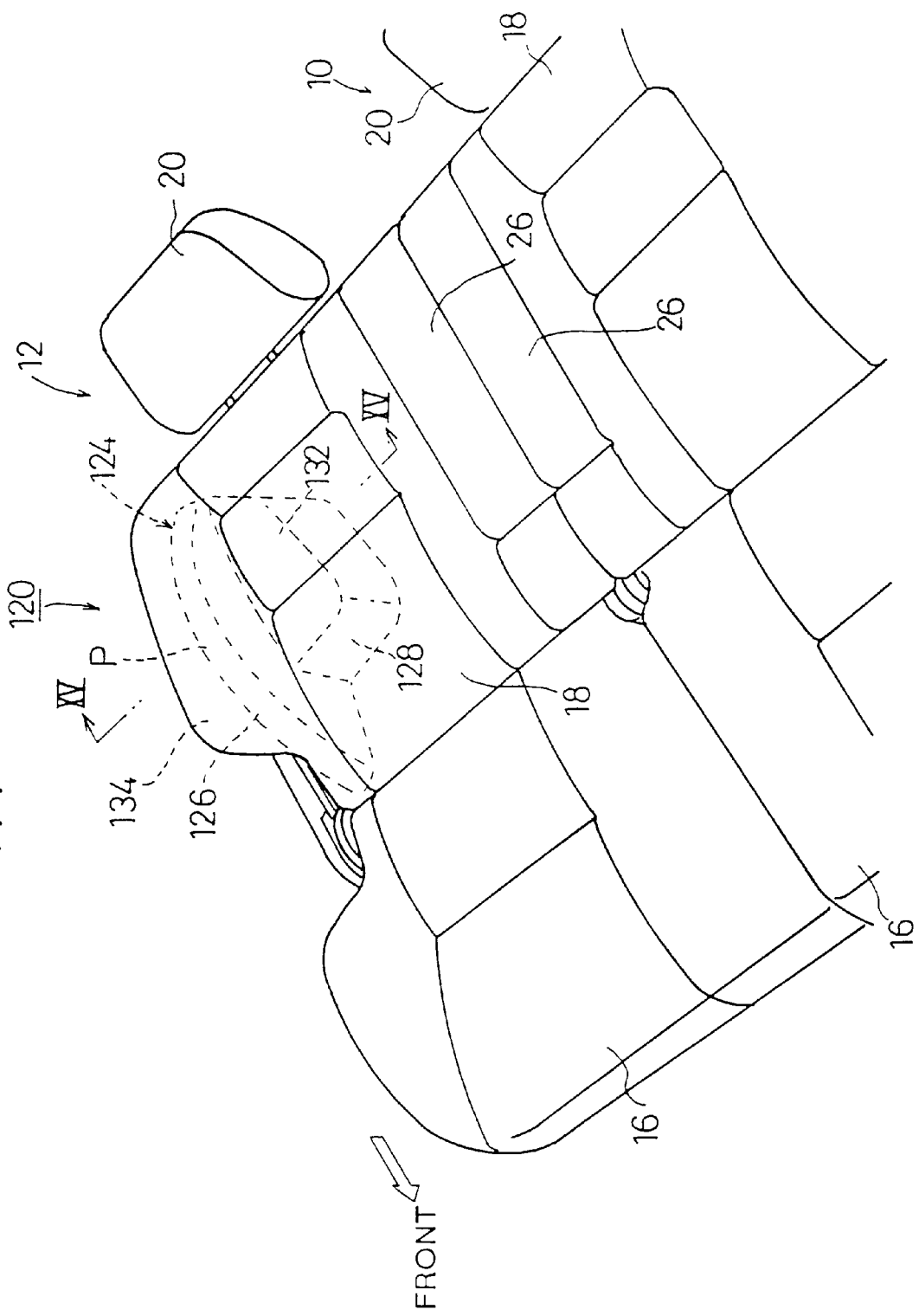
FIG. 14 is a perspective view of the rear seats, each of which incorporates the tilting structure according to the second embodiment.
Figure 15:
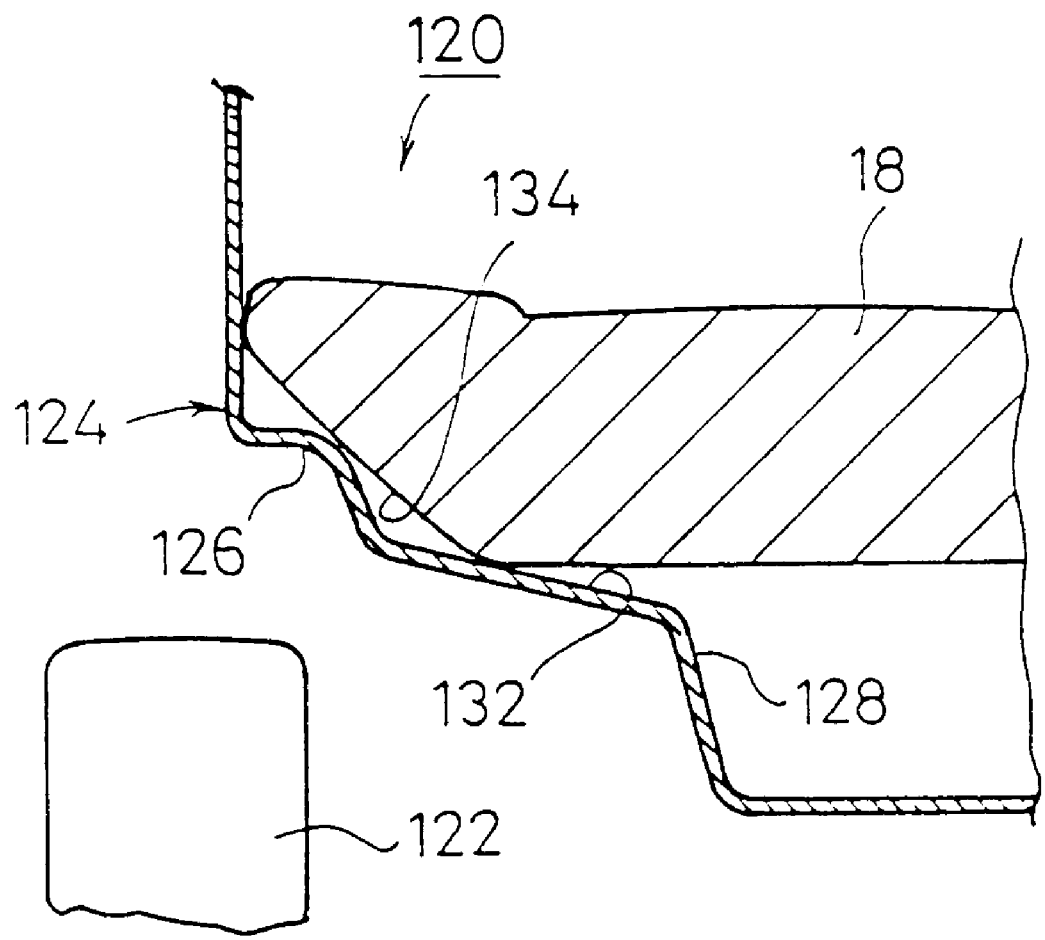
FIG. 15 is a fragmentary cross-sectional view taken along line XV—XV of FIG. 14.
Figure 16:
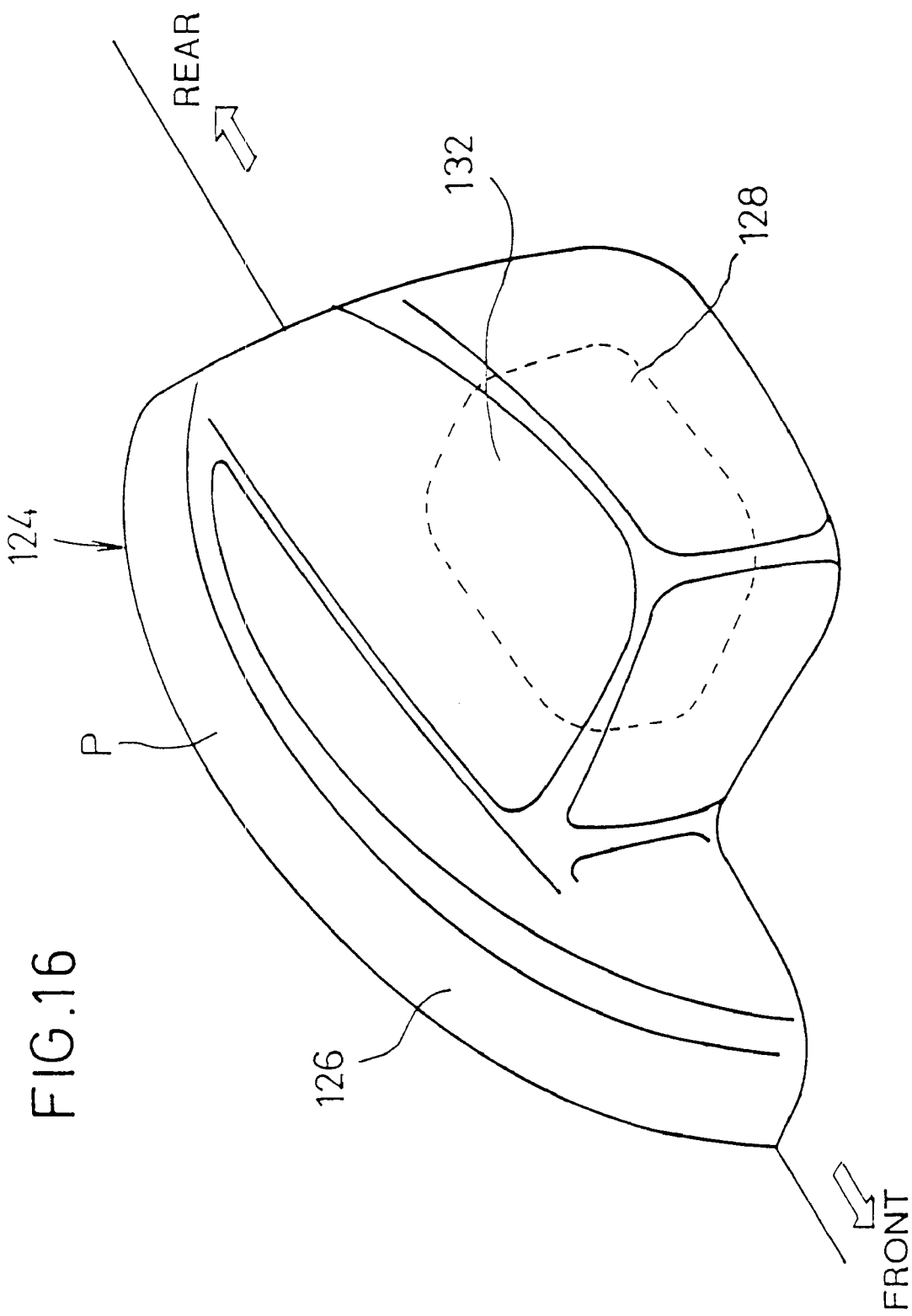
FIG. 16 is a perspective view of a side housing assembly of the tilting structure according to the second embodiment.
Figure 17:
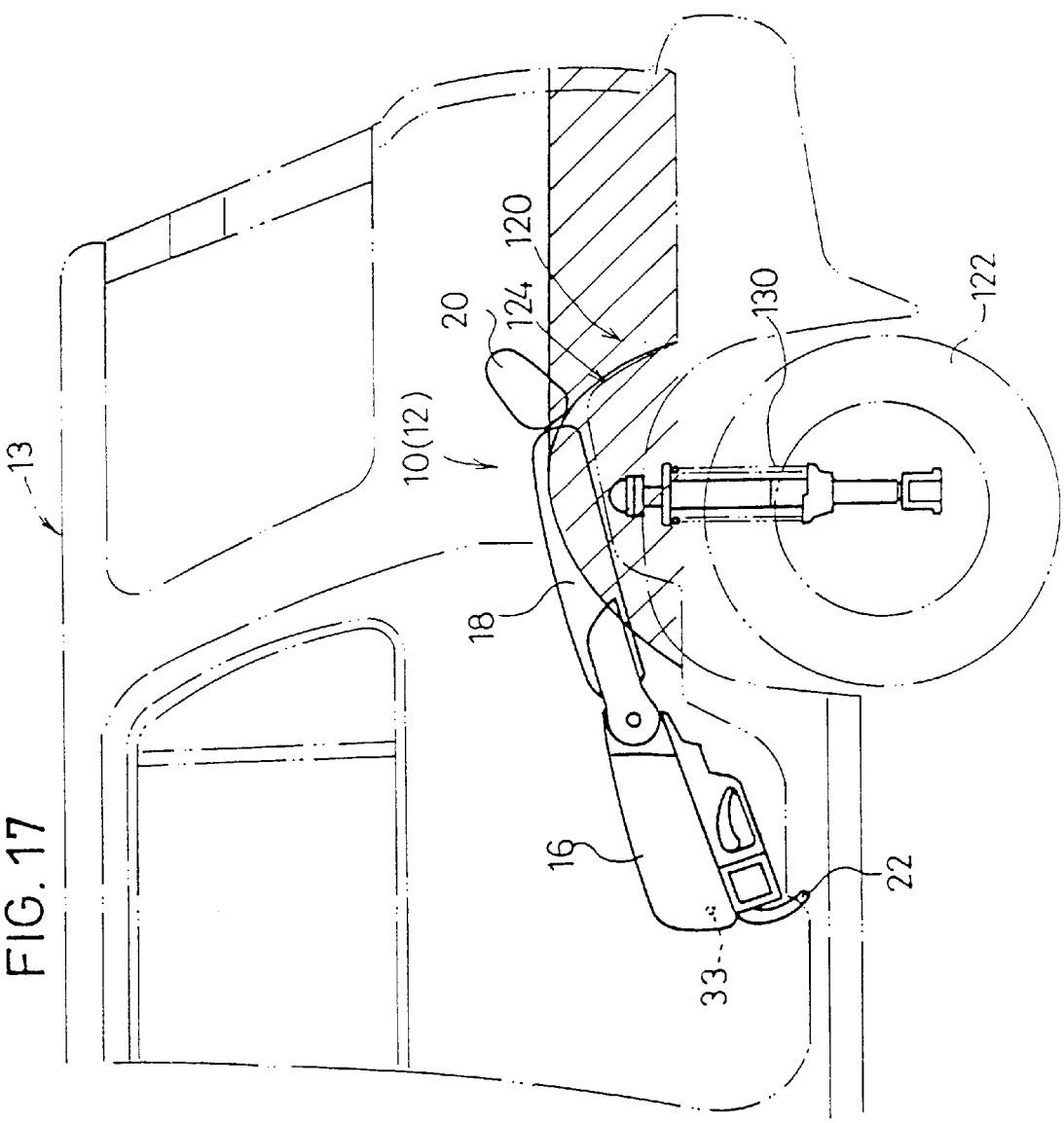
FIG. 17 is a side elevational view of the rear portion of the motor vehicle body, showing a base housing.

As shown in FIGS. 14 through 16, each of the side housing assemblies 124 comprises a wheel housing 126 complementary in shape to and housing a portion of one of the rear wheels 122, and a base housing 128 integral with the wheel housing 126 and housing a rear wheel damper base. The base housing 128 is positioned where the backrest 18 is tilted down rearward.

Figure 13:
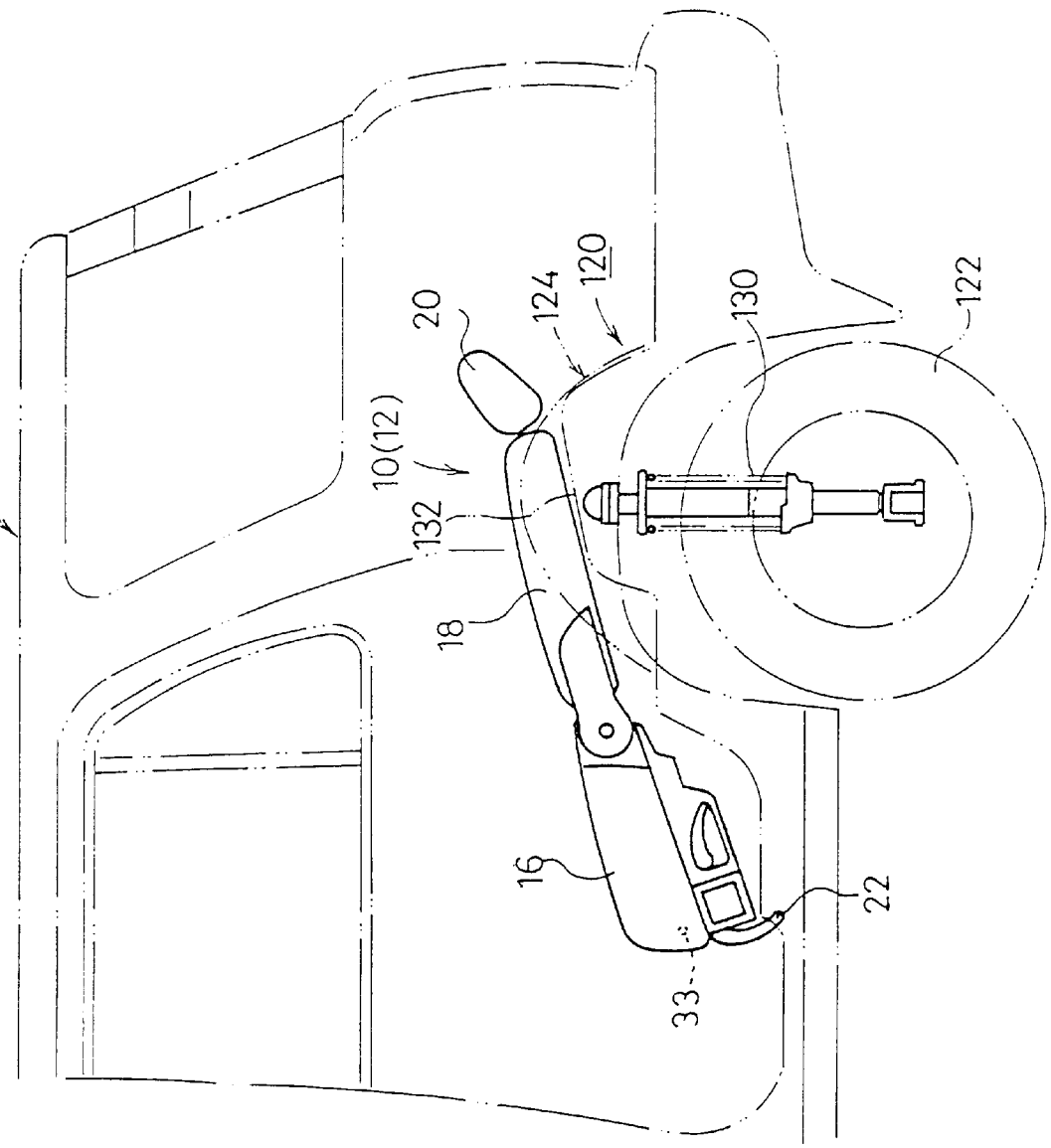
FIG. 13 is a side elevational view of the rear portion of the motor vehicle body.

The base housing 128 is positioned above a damper mechanism 130 of the rear wheel 122, and has a flat upper surface 132 which has a front end terminating at a position forward of an uppermost surface P of the wheel housing 126 and lower than an outer circumferential surface of the wheel housing 126. The flat upper surface 132 has a rear end terminating at a position lower than the uppermost surface P behind the uppermost surface P. As shown in FIGS. 13 and 16, the flat upper surface 132 is slanted downwardly in the forward direction parallel to the backrest 18 which is tilted down rearward. The base housing 128 may be positioned in a range shown hatched in FIG. 17.

As shown in FIG. 15, the backrest 18 has a clearance surface 134 on its rear side surface which is tapered off toward the side edge thereof such that the side portion of the backrest 18 can be supported on the base housing 128 out of physical interference with the wheel housing 126.

As described above, the flat upper surface 132 is lower than the uppermost surface P of the wheel housing 126, and the backrest 18 has the clearance surface 134 lying out of physical interference with the wheel housing 126. Therefore, when the backrest 18 is tilted down rearward, the backrest 18 can be moved down to the flat upper surface 132 of the base housing 128, lower than the uppermost surface P of the wheel housing 126, without being obstructed by the wheel housing 126.

Consequently, the backrest 18 can be tilted down rearward in its entirety through a large angle, rather than leaving a portion thereof untilted as is the case with the conventional backrest. As a result, when the backrest 18 is tilted down rearward, it provides a wide space in the transverse direction of the motor vehicle. The tilting structure 120 is of a relatively simple arrangement because it only requires the base housing 128 to have the flat upper surface 132 and the backrest 18 to have the clearance surface 134.

According to the second embodiment, furthermore, the flat upper surface 132 of the base housing 128 lies parallel to the backrest 18 as it is tilted down rearward. Therefore, when the backrest 18 is tilted down rearward, it is securely supported on the flat upper surface 132, and hence stably held in place.

Figure 12:
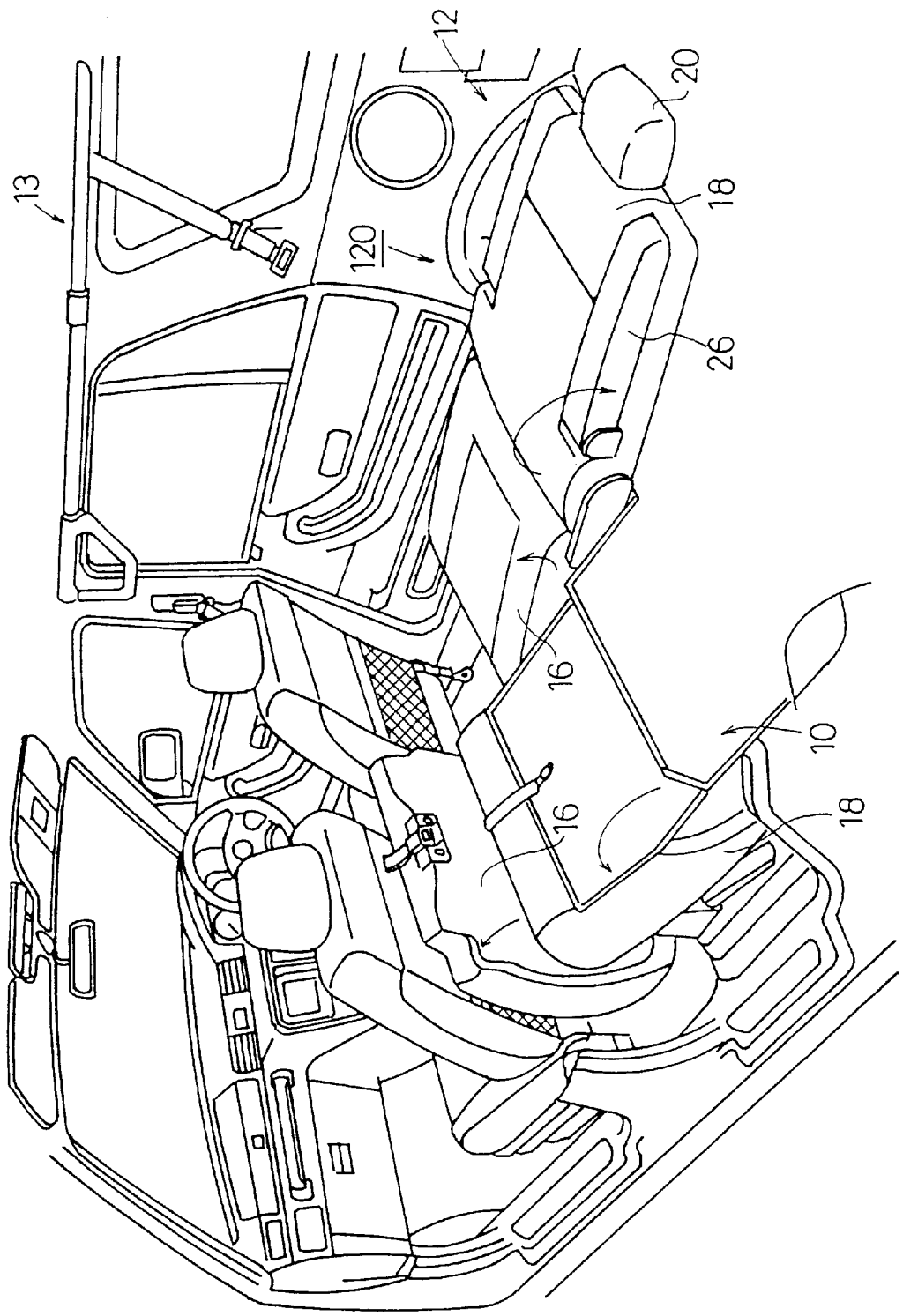
FIG. 12 is a perspective view of a rear portion of a motor vehicle body, as seen from the rear, which incorporates a tilting structure according to a second embodiment of the present invention.
Figure 18:
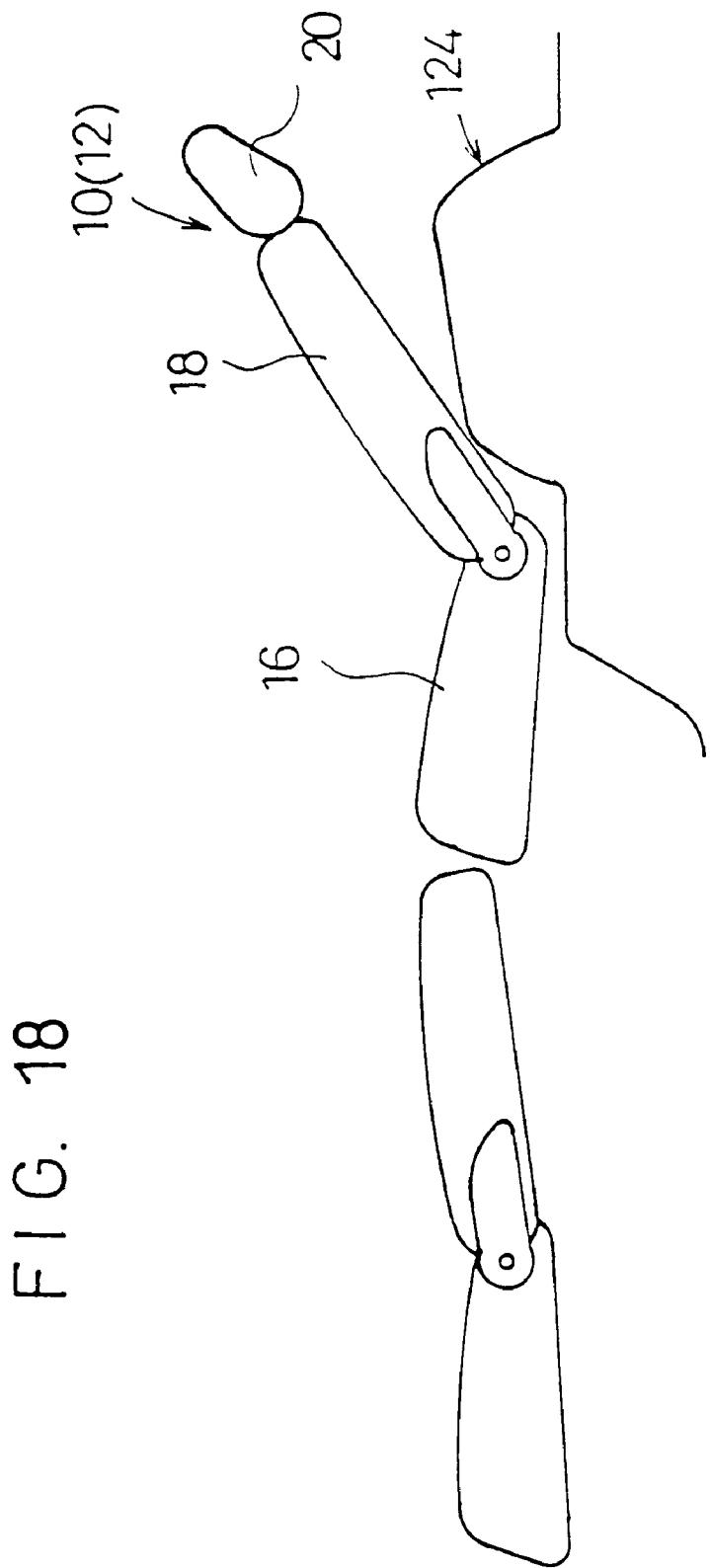
FIG. 18 is a side elevational view of the rear seats shown in FIG. 14, which are not made fully flat.
Figure 19:
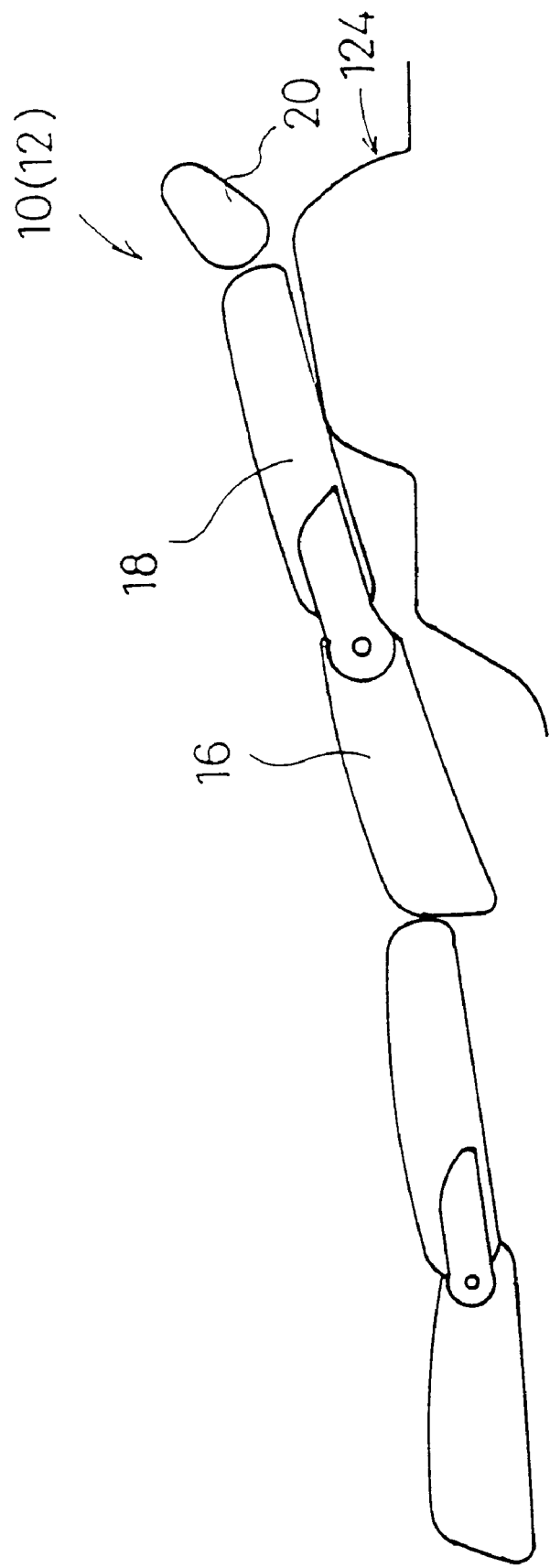
FIG. 19 is a side elevational view of the rear seats shown in FIG. 14, which are made fully flat.
Figure 20:
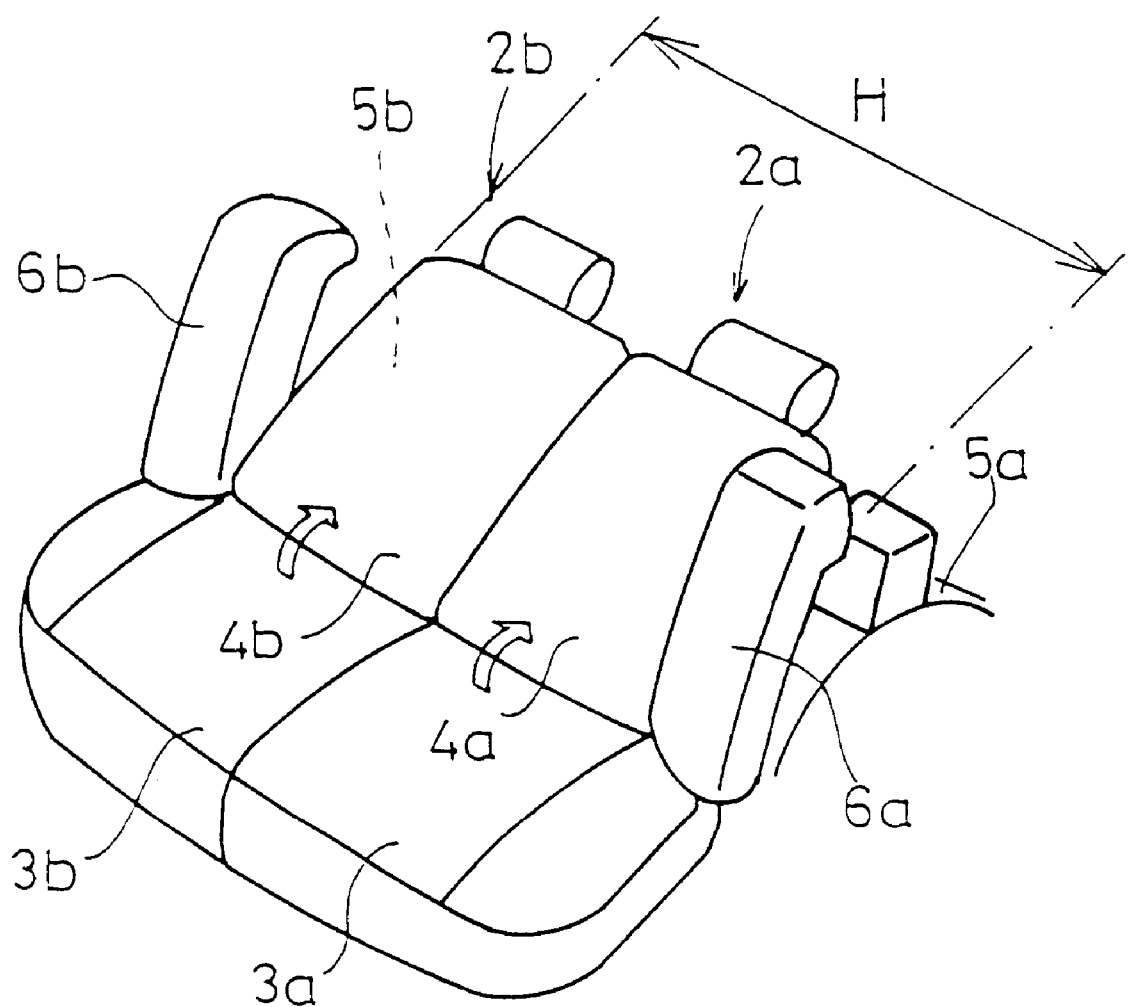
FIG. 20 is a perspective view of conventional rear seats.

Since the seat cushion 16 is tilted upwardly about its front end, when the seat cushion 16 is tilted upwardly and the backrest 18 is tilted down rearward, as shown in FIGS. 12 through 14, the rear seat 10 can be brought into in a substantially fully flat condition from the seat cushion 16 to the backrest 18. When the seat cushion 16 is not tilted upwardly as shown in FIG. 18, the backrest 18 is tilted through a smaller angle due to the wheel housing 126, preventing the rear seat 10 from being brought into the substantially fully flat condition. When the seat cushion 16 is tilted upwardly, as shown in FIG. 19, the backrest 18 is tilted through a greater angle, allowing the rear seat 10 to be brought into the substantially fully flat condition.

With the arrangement of the present invention, as described above, the seat cushion is tiltable by the tilting mechanism, and when the seat cushion is lifted forward after it has been released from the tilting mechanism and the backrest is lowered or tilted down forward, the rear surface of the backrest can be used as a cargo base. Therefore, the tilting structure according to the present invention is versatile in applications. When the seat cushion is lifted forward, it is separate from the tilting mechanism, but the tilting mechanism is covered with the cover. Therefore, the backrest which is tilted down forward over the tilting mechanism is prevented from being damaged or smeared because of the cover placed over the tilting mechanism.

When the backrest is tilted down rearward, the clearance surface of the backrest is held out of physical interference with the wheel housing, allowing the backrest to be tilted down rearward through a large angle. Accordingly, when the backrest is tilted down rearward, it can provide a wide space in the transverse direction of the motor vehicle.

Although certain preferred embodiments of the present invention have been shown and described in detail, it should be understood that various changes and modifications may be made therein without departing from the scope of the appended claims.

What is claimed is:

1. A tilting structure for tilting a motor vehicle seat, comprising:

a seat having a seat cushion;

a tilting mechanism disposed underneath said seat cushion for tilting the seat cushion upwardly about a front end thereof;

joint means detachably connecting a rear end of said seat cushion to said tilting mechanism; and a cover disposed between said seat cushion and said tilting mechanism and covering said tilting mechanism when said seat cushion is detached from and tilted in a forward direction away from said tilting mechanism.

2. A tilting structure for tilting a motor vehicle seat, comprising:

a seat having a seat cushion;

a tilting mechanism disposed underneath said seat cushion for tilting the seat cushion upwardly about a front end thereof; and joint means separably connecting a rear end of said seat cushion to said tilting mechanism;

wherein said tilting mechanism comprises:

a tiltable member tiltable about a front end thereof;

lock means for locking an end of said tiltable member on a motor vehicle floor;

openable and closeable link means having an end connected to said motor vehicle floor and an opposite end connected to said tiltable member, and movable to open and closed attitudes for tilting said tiltable member;

retainer means for retaining said openable and closable link means selectively in said open and closed attitudes; and biasing means for biasing said openable and closable link means to turn said seat cushion upwardly about the front end thereof in unison with said tiltable member when said openable and closable link means is released from said retainer means.

3. A tilting structure according to claim 2, wherein said lock means comprises:

a striker fixed to said motor vehicle floor;

a latch angularly movably supported on said end of said tiltable member and having an arm for engagement with said striker;

a cam engaging said latch for securing the latch to said striker; and a spring for normally biasing said cam and said latch in a direction to engage each other.

4. A tilting structure according to claim 3, further comprising a control member connected to said cam through a wire for actuating said cam in a direction away from said latch against the bias of said spring.

5. A tilting structure according to claim 2, wherein said openable and closable link means comprises:

a link having an end engaging said motor vehicle floor; and a link arm engaging an opposite end of said link and angularly movably supported on said end of said tiltable member, said link arm having first and second teeth;

wherein said biasing means comprises:

a spring for normally biasing said link arm to the open attitude;

and wherein said retainer means comprises:

a stopper having teeth for meshing selectively with said first and second teeth for keeping said openable and closable link means selectively in said open and closed attitudes; and an operating member for moving said stopper toward and away from said link arm.

6. A tilting structure according to claim 5, further comprising:

a spring for normally biasing said operating member toward said stopper; and a control member connected to said operating member for turning the operating member to move said stopper away from said link arm against the bias of said spring.

7. A tilting structure according to claim 2, further comprising a single control member connected to said lock means and said retainer means for controlling said lock means and said retainer means in unison with each other to release the end of said tiltable member from the motor vehicle floor and also release said openable and closable link means from said open and closed attitudes.

8. A tilting structure according to claim 2, further comprising a seat belt fixed to said end of said tiltable member.

9. A tilting structure according to claim 2, wherein said joint means comprises:

a lock member mounted on the end of said tiltable member;

a hook member for engaging said lock member under the bias of a spring on said seat cushion; and a tension string engaging said hook member for being pulled upwardly to a position above said seat cushion.

10. A tilting structure for tilting a motor vehicle seat, comprising:

a seat having a backrest which is tiltable down rearward; and a side housing assembly disposed behind said seat and housing a rear wheel;

said side housing assembly comprising:

a wheel housing projecting from a floor surface of the vehicle and being complementary in shape to a portion of the rear wheel, said wheel housing having an uppermost surface; and a base housing positioned above and covering a rear wheel damper mechanism, said base housing extending to a position forward of said uppermost surface and below an outer circumferential surface of said wheel housing, and also to a position behind said uppermost surface and below said uppermost surface.

11. A tilting structure according to claim 10, wherein said backrest has a clearance surface for keeping the backrest out of physical interference with said wheel housing when the backrest is tilted down rearward.

12. A tilting structure according to claim 10, wherein said seat has a seat cushion, further comprising a tilting mechanism disposed underneath said seat cushion for tilting the seat cushion upwardly about a front end thereof.

13. A tilting structure according to claim 12, further comprising:

joint means separably connecting a rear end of said seat cushion to said tilting mechanism.

14. A tilting structure according to claim 13, further comprising a cover disposed between said seat cushion and said tilting mechanism and covering said tilting mechanism.

15. A tilting structure according to claim 13, wherein said joint means comprises:

a lock member mounted on the end of said tiltable member;

a hook member for engaging said lock member under the bias of a spring on said seat cushion; and a tension string engaging said hook member for being pulled upwardly to a position above said seat cushion.

16. A tilting structure for tilting a motor vehicle seat, comprising:

a seat having a backrest which is tiltable down rearward; and a side housing assembly disposed behind said seat and housing a rear wheel;

said side housing assembly comprising:

a wheel housing complementary in shape to a portion of the rear wheel, said wheel housing having an uppermost surface;

a base housing extending to a position forward of said uppermost surface and below an outer circumferential surface of said wheel housing, and also to a position behind said uppermost surface and below said outer circumferential surface; and wherein said base housing has a flat upper surface and said base housing is slanted downwardly in a forward direction parallel to the backrest when the backrest is tilted down rearward.

17. A tilting structure for tilting a motor vehicle seat, comprising:

a seat having a backrest which is tiltable down rearward; and a side housing assembly disposed behind said seat and housing a rear wheel;

said side housing assembly comprising:

a wheel housing complementary in shape to a portion of the rear wheel, said wheel housing having an uppermost surface;

a base housing extending to a position forward of said uppermost surface and below an outer circumferential surface of said wheel housing, and also to a position behind said uppermost surface and below said outer circumferential surface, wherein said seat has a seat cushion, further comprising a tilting mechanism disposed underneath said seat cushion for tilting the seat cushion upwardly about a front end thereof; and wherein said tilting mechanism comprises:

a tiltable member tiltable about a front end thereof;

lock means for locking an end of said tiltable member on a motor vehicle floor;

openable and closable link means having an end connected to said motor vehicle floor and an opposite end connected to said tiltable member, and movable to open and closed attitudes for tilting said tiltable member;

retainer means for retaining said openable and closable link means selectively in said open and closed attitudes; and biasing means for biasing said openable and closable link means to turn said seat cushion upwardly about the front end thereof in unison with said tiltable member when said openable and closable link means is released from said retainer means.

18. A tilting structure according to claim 17, wherein said lock means comprises:
a striker fixed to said motor vehicle floor;
a latch angularly movably supported on said end of said tiltable member and having an arm for engagement with said striker;
a cam engaging said latch for securing the latch to said striker; and
a spring for normally biasing said cam and said latch in a direction to engage each other.

19. A tilting structure according to claim 18, further comprising a control member connected to said cam through a wire for actuating said cam in a direction away from said latch against the bias of said spring.

20. A tilting structure according to claim 17, wherein said openable and closable link means comprises:
a link having an end engaging said motor vehicle floor; and
a link arm engaging an opposite end of said link and angularly movable supported on said end of said tiltable member, said link arm having first and second teeth;
wherein said biasing means comprises:
a spring for normally biasing said link arm to the open attitude;
and wherein said retainer means comprises:
a stopper having teeth for meshing selectively with said first and second teeth for keeping said openable and closable link means selectively in said open and closed attitudes; and
an operating member for moving said stopper toward and away from said link arm.

21. A tilting structure according to claim 20, further comprising:
a spring for normally biasing said operating member toward said stopper; and
a control member connected to said operating member for turning the operating member to move said stopper away from said link arm against the bias of said spring.

22. A tilting structure according to claim 17, further comprising a single control member connected to said lock means and said retainer means for controlling said lock means and said retainer means in unison with each other to release the end of said tiltable member from the motor vehicle floor and also release said openable and closable link means from said open and closed attitudes.

23. A tilting structure according to claim 17, further comprising a seat belt fixed to said end of said tiltable member.

24. A tilting structure for tilting a motor vehicle seat, comprising:
a seat having a seat cushion and a backrest mounted on a tiltable member, said backrest pivotally mounted at a rear end of said tiltable member or being pivoted rearward and down forwardly; and
a tilting mechanism disposed underneath said seat cushion for tilting said tiltable member upwardly about a front end thereof and inclining the seat cushion, whereby said seat cushion and backrest produce a substantially flat upper surface when said backrest is pivoted rearwardly; and means pivotally mounting said seat cushion for pivoting said seat cushion upwardly and forwardly away from said tilting mechanism to a storage position.

25. A tilting structure according to claim 24, wherein said backrest is pivotable forward to a storage position over said tiltable member.

26. A tilting structure according to claim 24, wherein said tilting mechanism includes openable and closable link means movable to open and closed attitudes for tilting said tiltable member, and said link means comprises:
a link having an end engaging a floor of the motor vehicle; and
a link arm engaging an opposite end of said link and angularly movably supported on said rear end of said tiltable member.

27. A tilting structure according to claim 24, further comprising a seat belt fixed to said rear end of said tiltable member.

28. A tilting structure according to claim 24, further including:
a side housing assembly of the motor vehicle disposed behind said seat and housing a rear wheel;
said side housing assembly comprising:
a wheel housing complementary in shape to a portion of the rear wheel, said wheel housing having an uppermost surface; and
a base housing extending to a position forward to said uppermost surface and below an outer circumferential surface of said wheel housing, and also to a position behind said uppermost surface and below said outer circumferential surface.

29. A tilting structure according to claim 28, wherein said backrest has a clearance surface for avoiding physical interference with said wheel housing when the backrest is tilted down rearward.

30. A tilting structure according to claim 28, wherein said base housing has a flat upper surface and said base housing is slanted downwardly in a forward direction parallel to the backrest when the backrest is tilted down rearward.

31. A tilting structure for tilting a motor vehicle seat, comprising:
a seat having a seat cushion and a backrest mounted on a tiltable member, said backrest pivotally mounted at a rear end of said tiltable member for being pivoted rearward and down forwardly; and
a tilting mechanism disposed underneath said seat cushion for tilting said tiltable member upwardly about a front end thereof for said seat cushion and backrest to produce a substantially flat upper surface when said backrest is pivoted rearwardly; and
wherein said tilting mechanism comprises:
lock means for locking an end of said tiltable member on a motor vehicle floor;
openable and closable link means having an end connected to said motor vehicle floor and an opposite end connected to said tiltable member, and movable to open and closed attitudes for tilting said tiltable member;
retainer means for retaining said openable and closable link means selectively in said open and closed attitudes; and
biasing means for biasing said openable and closable link means to turn said seat cushion upwardly about the front end thereof in unison with said tiltable member when said openable and closable link means is released from said retainer means.

32. A tilting structure according to claim 31, further comprising a single control member connected to sad lock means and said retainer means for controlling said lock means and said retainer means in unison with each other to release the end of said tiltable member from the motor vehicle floor and also release said openable and closable link means.

33. A tilting structure for tilting a motor vehicle seat, comprising:

a seat having a seat cushion and a backrest mounted on a tiltable member, said backrest pivotally mounted at a rear end of said tiltable member or being pivoted rearward and down forwardly;

a tilting mechanism disposed underneath said seat cushion for tilting said tiltable member upwardly about a front end thereof for said seat cushion and backrest to produce a substantially flat upper surface when said backrest is pivoted rearwardly; and wherein said tilting mechanism includes lock means for locking the rear end of said tiltable member to a floor of the motor vehicle and lock means comprises:

a striker fixed to said motor vehicle floor;

a latch angularly movably supported on said end of said tiltable member and having an arm for engagement with said striker;

a cam engaging said latch for securing the latch to said striker; and a spring for normally biasing said cam and said latch in a direction to engage each other.

34. A tilting structure according to claim 33, further comprising a control member connected to said cam through a wire for actuating said cam in a direction away from said latch against the bias of said spring.

* * * * *